(12) United States Patent
Abe

(10) Patent No.: US 8,419,054 B2
(45) Date of Patent: Apr. 16, 2013

(54) AIRBAG AND AIRBAG APPARATUS

(75) Inventor: Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 163 days.

(21) Appl. No.: 12/672,755

(22) PCT Filed: May 28, 2008

(86) PCT No.: PCT/JP2008/059784
§ 371 (c)(1),
(2), (4) Date: Jan. 7, 2011

(87) PCT Pub. No.: WO2009/019924
PCT Pub. Date: Feb. 12, 2009

(65) Prior Publication Data
US 2011/0101652 A1    May 5, 2011

(30) Foreign Application Priority Data
Aug. 9, 2007  (JP) ................ 2007-208221

(51) Int. Cl.
*B60R 21/30* (2006.01)
(52) U.S. Cl.
USPC ...... 280/739; 280/731; 280/743.1; 280/743.2
(58) Field of Classification Search .......... 280/731, 280/739, 743.1, 743.2
See application file for complete search history.

(56) References Cited

U.S. PATENT DOCUMENTS

| | | | |
|---|---|---|---|
| 6,131,942 A | 10/2000 | Fujii et al. | |
| 6,290,257 B1 | 9/2001 | Bunce et al. | |
| 6,471,244 B1 * | 10/2002 | Nishijima et al. | ............ 280/742 |
| 7,513,527 B2 | 4/2009 | Lube et al. | |
| 7,931,297 B2 * | 4/2011 | Abe et al. | ............ 280/739 |
| 7,954,850 B2 * | 6/2011 | Fischer et al. | ............ 280/743.1 |
| 8,020,889 B2 * | 9/2011 | Bauer et al. | ............ 280/739 |
| 8,070,183 B2 * | 12/2011 | Kumagai et al. | ............ 280/743.2 |
| 2005/0098990 A1 * | 5/2005 | Pinsenschaum et al. | ..... 280/739 |
| 2005/0225065 A1 | 10/2005 | Fujll | |
| 2005/0248137 A1 | 11/2005 | Delventhal et al. | |
| 2006/0151979 A1 | 7/2006 | DePottey et al. | |

FOREIGN PATENT DOCUMENTS

| | | |
|---|---|---|
| EP | 0 974 497 A1 | 6/1998 |
| FR | 2 757 465 A1 | 6/1998 |
| JP | H06-127330 A | 5/1994 |
| JP | H11-334524 A | 12/1999 |
| JP | 2000-043672 A | 2/2000 |
| JP | 2005-022523 A | 1/2005 |
| JP | 2005-153726 A | 6/2005 |
| WO | WO 2004/009404 A2 | 1/2004 |
| WO | WO 2006/041547 A2 | 4/2006 |
| WO | WO 2006/041552 A2 | 4/2006 |
| WO | 2006/131111 A1 | 12/2006 |

OTHER PUBLICATIONS

Extended European search report issued in the counterpart European Application No. 08 76 4800 dated Mar. 24, 2011 (3 pages).

* cited by examiner

*Primary Examiner* — Toan To
(74) *Attorney, Agent, or Firm* — Fitch Even Tabin & Flannery, LLP

(57) ABSTRACT

An airbag that can inflate without using a high-power inflator, and an airbag apparatus provided with such an airbag are disclosed. In one form, the airbag, when inflating, has a normally open vent hole disposed in a rear panel in a region extending toward the center of a steering wheel from the rim of the steering wheel and an openable vent hole disposed in a region extending toward the outside of the steering wheel from the rim. The openable vent hole is covered by a cover. The cover and a strap inside the airbag are connected to each other with a tether. From the commencement of inflation of the airbag, the cover is placed over the openable vent hole to close the openable vent hole.

12 Claims, 10 Drawing Sheets

AIRBAG AND AIRBAG APPARATUS

CROSS-REFERENCE TO RELATED APPLICATIONS

This application is a U.S. national phase application filed under 35 U.S.C. §371 of International Application PCT/JP2008/059784, filed on May 28, 2008, designating the United States, which claims priority from Japanese Application 2007-208221, filed Aug. 9, 2007, which are hereby incorporated herein by reference in their entirety.

FIELD OF THE INVENTION

The present invention relates to an airbag provided with a normally open vent hole that is normally open and an openable vent hole that can be opened or closed with a closing member. The present invention also relates to an airbag apparatus provided with such an airbag.

BACKGROUND OF THE INVENTION

In the present invention, closing an openable vent hole includes changing the openable vent hole from a large opening degree to a small opening degree. Also, opening an openable vent hole includes changing the openable vent hole from a small degree of opening to a large degree of opening.

It is well known that airbags are provided with a vent hole and that, when a vehicle occupant or the like collides with an inflated airbag, an impact on such a vehicle occupant is absorbed by gas being discharged from the airbag through such a vent hole.

WO2006/041552 describes an airbag having a band (cinch tube) formed around a vent hole (aperture) so as to allow such a vent hole to be tied up. The vent hole is disposed on the side of the airbag in an inflated state, while the band is connected to the occupant side of the inflated airbag through the inside of the airbag.

In WO2006/041552, the vent hole is in an open state when the airbag begins to inflate (FIG. 5A of WO2006/041552).

As the airbag inflates and the occupant side of the airbag expands toward the occupant, the band is drawn into the inside of the airbag to tie up the vent hole, thereby causing the vent hole to be closed.

In WO2006/041552, a normally open vent hole (vent) that is in a normally open state is provided, independently of the openable vent hole that can be closed by the band as described above.

If an airbag inflates when an occupant is seated in a normal seating position or in a so-called in-position, the airbag inflates into a normal inflation completed shape. In this case, the openable vent hole is closed by being tied up with a band, as described above. When the occupant comes into contact with the airbag, gas is discharged to the outside of the airbag through the normally open vent hole (FIG. 5C of WO2006/041552).

If the airbag inflates when the occupant is seated forward from a normal seating position or in a so-called out-of-position, the occupant comes into contact with the occupant side of the airbag before the airbag inflates into a normal inflation completed shape, namely, before the openable vent hole has been closed by being tied up with the band. In this case, since the band is not further drawn into the inside of the airbag, the openable vent hole remains open, causing gas to be discharged to the outside of the airbag through both the openable vent hole and the normally open vent hole (FIG. 5F of WO2006/041552).

In the foregoing WO2006/041552, the openable vent hole remains opened when the airbag begins to inflate, which makes it difficult to allow the airbag to promptly inflate. In order to promptly inflate the airbag described in WO2006/041552, a high-power inflator must be used.

SUMMARY OF THE INVENTION

An object of the present invention is to provide an airbag having a normally open vent hole that is normally open and an openable vent hole that can be opened or closed by a closing member, the airbag being capable of inflating promptly without using a high-power inflator, and an airbag apparatus equipped with such an airbag.

An airbag according to the first embodiment is an airbag that inflates using gas from an inflator, which has a normally open vent hole that is normally open and an openable vent hole that can be opened or closed by a closing member, wherein the closing member closes the openable vent hole when the airbag begins to inflate.

An airbag according to the second embodiment is an airbag according to the first embodiment, wherein a total opening area of the normally open vent hole is smaller than a total opening area of the openable vent hole in an open state.

An airbag according to the third embodiment is an airbag according to the second embodiment, wherein a total opening area of the normally open vent hole is 5 to 50% of a total opening area of the openable vent hole in an open state.

An airbag according to the fourth embodiment is an airbag according to any one of the first to third embodiments, wherein the normally open vent hole is disposed in the airbag in a position closer to the inflator than the openable vent hole in the airbag.

An airbag according to the fifth embodiment is an airbag according to any one of the first to fourth embodiments, wherein the airbag is a driver side airbag that inflates toward an occupant side of a vehicle steering wheel and, when the airbag inflates, the openable vent hole is disposed in a region extending toward the outside of the steering wheel from the steering wheel rim, and the normally open vent hole is disposed in a region extending toward the center of the steering wheel from the rim.

An airbag according to the sixth embodiment is an airbag according to the fifth embodiment, wherein, when the airbag inflates, the normally open vent hole is disposed in the airbag in a range 330 mm in diameter, which is substantially coaxial with the steering wheel.

An airbag according to the seventh embodiment is an airbag according to the sixth embodiment, wherein, when the airbag inflates, the normally open vent hole is disposed in the airbag in a range 165 mm in diameter, which is substantially coaxial with the steering wheel.

An airbag according to the eighth embodiment is an airbag according to the seventh embodiment, wherein the normally open vent hole has a total opening area of 175 to 650 mm$^2$.

An airbag according to the ninth embodiment is an airbag according to any of the first to eighth embodiments, wherein the closing member is a cover covering the openable vent hole, which is provided with a connecting member that connects a side opposing the occupant of the airbag and the closing member through the inside of the airbag, wherein, when the airbag begins to inflate, the cover is placed over the openable vent hole, thereby closing the openable vent hole, wherein, until the occupant comes into contact with the side opposing the occupant of the inflated airbag, the connecting member is under strain between the side opposing the occupant of the airbag and the cover, thereby preventing the cover from moving away from the openable vent hole and thereby keeping the openable vent hole closed with the cover, and wherein, when the occupant comes into contact with the side opposing the occupant of the inflated airbag, pushing the side opposing the occupant into the inside of the airbag, the connecting member becomes loose, causing the cover to move away from the openable vent hole due to gas pressure inside the airbag, thereby causing the openable vent hole to be released.

An airbag according to the tenth embodiment is an airbag according to the ninth embodiment, wherein the normally open vent hole is provided in a region of the cover which overlaps the openable vent hole.

An airbag apparatus according to the eleventh embodiment includes an airbag according to any of the first to tenth embodiment and an inflator that inflates the airbag.

An airbag apparatus according to the twelfth embodiment is an airbag apparatus according to the eleventh embodiment, which includes an airbag according to the seventh or eighth embodiment, a mounting member to which the airbag is mounted, and a module cover that is mounted to the mounting member so as to cover the airbag in a non-inflated state and splits open at the time of inflation of the airbag, wherein at least one portion of the mounting member, the module cover, and a section between the mounting member and the module cover has an opening provided for releasing gas discharged from the normally open vent hole of the airbag into a side, opposite to the airbag, of at least one of the mounting member and the module cover.

DETAILED DESCRIPTION

Figure 1:
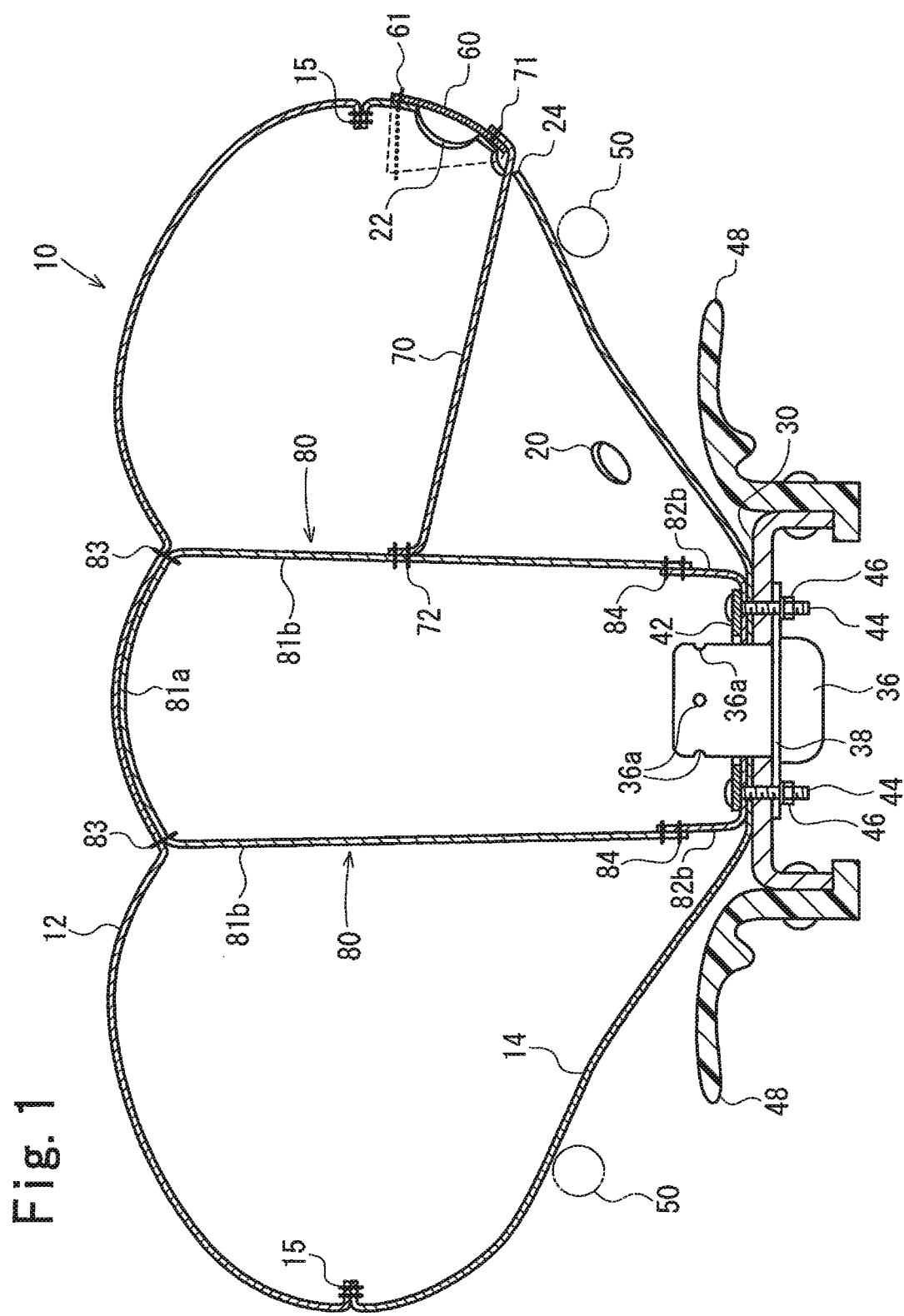
FIG. 1 is a cross-sectional view of a driver side airbag and an airbag apparatus according to an embodiment.

In an airbag according to the first embodiment and an airbag apparatus according to the eleventh embodiment, when an airbag begins to inflate, an openable vent hole is closed with a closing member, thereby allowing the airbag to promptly inflate using gas from an inflator, eliminating the need for a high-power inflator.

In the present invention, as is the case with the second embodiment, it is preferable that a total opening area of a normally open vent hole is smaller than a total opening area of an openable vent hole in an open state. In particular, as is the case with the third embodiment, it is preferable that a total opening area of a normally open vent hole is 5 to 50% of a total opening area of an openable vent hole in an open state. If a plurality of the normally open vent holes and a plurality of the openable vent holes are provided, the total opening area refers a sum of opening area of the normally open vent holes and a sum of opening area of the openable vent holes in an open state.

With the arrangement described in the fourth embodiment, even if an occupant is seated in an out-of-position which is forward from a normal seating position, gas is discharged in a rapid manner to the outside of the airbag through the normally open vent hole that is located closer to the inflator than the openable vent hole, namely, closer to the base end side from which the airbag inflates.

When the present invention is applied to a driver side airbag, the arrangement described in the fifth embodiment prevents the rim of the steering wheel from interfering with opening operation of the closing member at the time of opening of the openable vent hole, thereby allowing the closing member to smoothly perform opening operation. Also, the rim does not interfere with gas discharged from the normally open vent hole, thereby allowing gas to be smoothly discharged through the normally open vent hole.

In this case, as is the case with the sixth and seventh embodiments, it is preferable that, when the airbag inflates, the normally open vent hole is disposed in the airbag in a range 330 mm in diameter, in particular, 165 mm in diameter, which is substantially coaxial with the steering wheel.

In this case, as is the case with the eighth embodiment, it is preferable that the normally open vent hole has a total opening area of 175 to 650 mm$^2$.

In the case where, when the airbag inflate, the normally open vent hole is disposed in the airbag in a range 165 mm in diameter, which is substantially coaxial with the steering wheel, the normally open vent hole, when the airbag inflates, becomes faced with an airbag mounting member of the airbag apparatus or a module cover that begins to split open in conjunction with inflation of the airbag. For this reason, as is the case with the twelfth embodiment, it is preferable that at least one portion of the mounting member, the module cover, and a section between the mounting member and the module cover has an opening provided for releasing gas discharged from the normally open vent hole of the airbag into the side opposite to the airbag of at least one of the mounting member and the module cover.

In the ninth embodiment, a cover that covers an openable vent hole is provided as a closing member. Such a cover has a simplified structure. In the present invention, the cover may cover the openable vent hole from the inside of the airbag or cover the openable vent hole from the outside of the airbag.

If the cover covering the openable vent hole is provided as the closing member, as described above, a normally open vent hole may be provided in a region of the cover which overlaps the openable vent hole, as is the case with the tenth embodiment.

An embodiment of the present invention will now be described with reference to the attached drawings.

Figure 2:
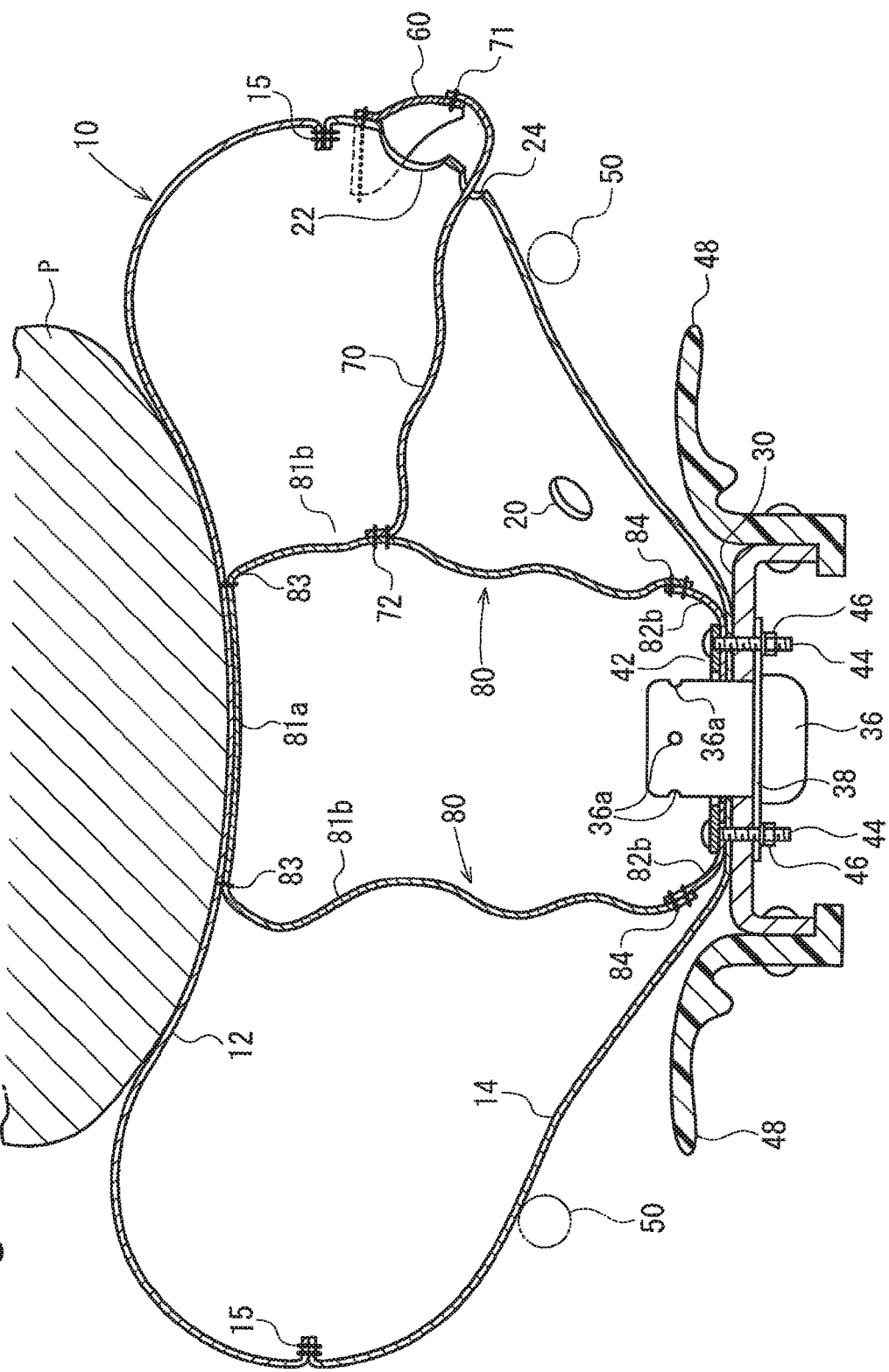
FIG. 2 is a cross-sectional view of an airbag and an airbag apparatus of FIG. 1 as an occupant is received.
Figure 3:
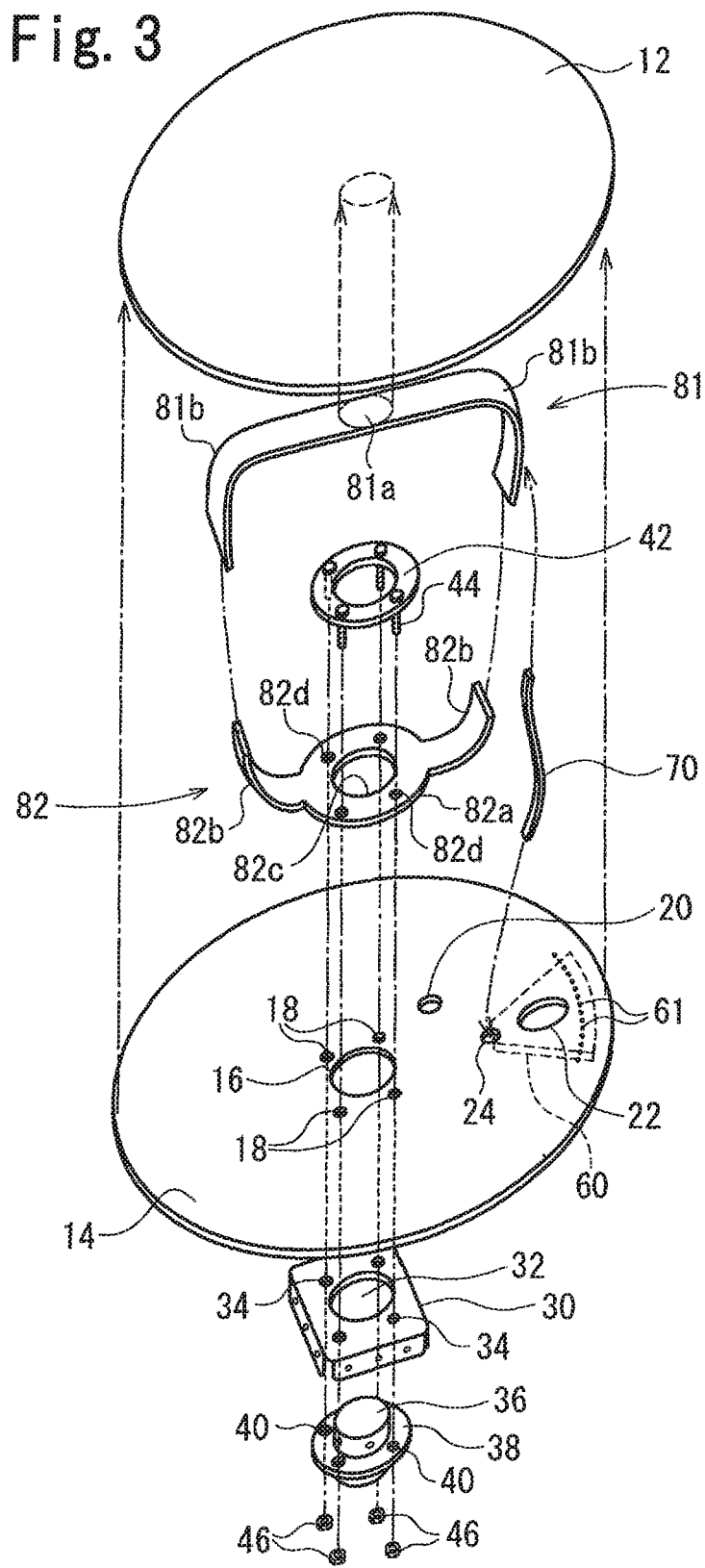
FIG. 3 is a disassembled perspective view of an airbag and an airbag apparatus of FIG. 1.
Figure 4:
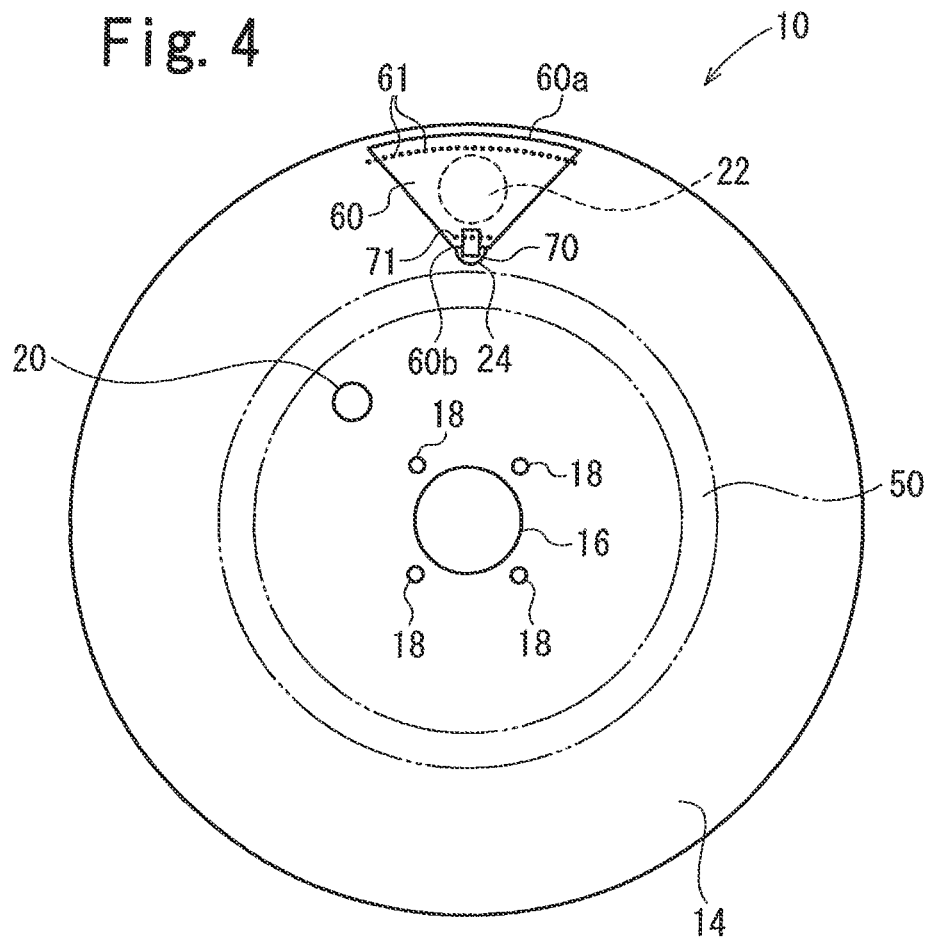
FIG. 4 is a plan view of an airbag of FIG. 1, as seen from the rear panel.

FIG. 1 and FIG. 2 are cross-sectional views of an airbag and an airbag apparatus according to an embodiment. FIG. 3 is a disassembled perspective view of the airbag and airbag apparatus. FIG. 4 is a plan view of the airbag, as seen from the rear panel. FIG. 1 shows the state of the airbag before an occupant comes into contact with the airbag, while FIG. 2 shows the state of the airbag after an occupant has come into contact with the airbag.

In this embodiment, an airbag 10 is a driver side airbag that inflates toward an occupant side of a vehicle steering wheel. In subsequent descriptions, reference to a vertical direction is relative to the steering wheel's position when the driver is steering the vehicle straight ahead.

The airbag 10 includes a front panel 12 that constitutes a face opposing an occupant, a rear panel 14 that constitutes a back side opposite to such a face opposing an occupant, a strap 80 that connects the front panel 12 and the rear panel 14 inside the airbag 10, a normally open vent hole 20 that is normally communicated with the inside and outside of the airbag 10, an openable vent hole 22 that can be opened or closed by a cover 60 as a closing member, and a tether 70 as a connecting member which connects the cover 60 to the strap 80.

The front panel 12 and the rear panel 14 are made of a circular woven cloth. The front panel 12 and the rear panel 14 have substantially the same diameter and form a bag by the outer circumferential edges thereof being sewed into each other with a seam 15. Such a seam 15 is installed in an annular shape around the outer circumference of the front panel 12 and the rear panel 14. The seam 15 is composed of, but not limited to, sewing thread or the like.

The rear panel 14 has an opening 16 for an inflator, namely, a gas generator, the normally open vent hole 20, and the openable vent hole 22 formed therein. The opening 16 is disposed in the middle of the rear panel 14. Bolt insertion holes 18 that pass through the rear panel 14 are provided around the opening 16.

The rear panel 14 is connected at the central portion thereof to the steering wheel in a substantially coaxial manner via a retainer 30 or the like. As shown in FIGS. 1, 2, and 4, the normally open vent hole 20, when the airbag 10 inflates, is disposed in the rear panel 14 in a region extending toward the center of the steering wheel from the rim 50 of the steering wheel, namely, in an inner region of the rear panel 14 extending inward from the rim 50. Also, the openable vent hole 22, when the airbag 10 inflates, is disposed in a rear panel 14 in a region extending toward the outside of the steering wheel from the rim, namely, in an outer region of the rear panel 14 extending outward from the rim 50.

In the present invention, it is preferable that the normally open vent hole 20 is disposed in the rear panel 14 in a range 330 mm in diameter, in particular, 165 mm in diameter, which is substantially coaxial with the rear panel 14.

In this embodiment, the normally open vent hole 20 is disposed in the rear panel 14 at a position that does not overlap a module cover 48 to be described later when the module cover 48 splits open in conjunction with inflation of the airbag 10, namely, in the obliquely upper left portion relative to the opening 16 for the inflator, when the rear panel 14 is viewed from the steering wheel. Also, in this embodiment, the openable vent hole 22 is disposed at the upper end of the rear panel 14. However, the locations of the normally open vent hole 20 and the openable vent hole 22 are not limited to these.

In this embodiment, each of the normally open vent hole 20 and the openable vent hole 22 consists of a substantially circular opening, and the shape of the normally open vent hole 20 and the openable vent hole 22 is not limited to this. For example, the normally open vent hole 20 and the openable vent hole 22 may have a slit-like shape.

In the present invention, preferably an opening area of the normally open vent hole 20 is smaller than an opening area of the openable vent hole 22 in an open state. In particular, it is preferable that the opening area of the normally open vent hole 20 is 5 to 50% of the opening area of the openable vent hole 22 in an open state, and 15 to 40% is especially preferable.

In this embodiment, one normally open vent hole 20 and one openable vent hole 22 are provided, but may be respectively provided in a plurality. In this case, it is preferable that a total sum of opening areas of all the normally open vent holes 20 is smaller than a total sum of opening areas of all the openable vent holes 22 in an open state.

In the present invention, preferably the total opening area of the normally open vent hole is 175 to 650 mm$^2$.

In this embodiment, the cover 60 covers the openable vent hole 22 from the outside of the airbag 10. As shown in FIG. 4, in this embodiment the cover 60 is composed of a substantially fan-shaped woven cloth and is placed over the openable vent hole 22 in such a manner that its arc-shaped peripheral edge 60a is directed toward the outer circumference of the rear panel 14 and a convex angle portion 60b opposite the peripheral edge 60a is directed toward the center of the rear panel 14. The cover 60 is sewed along the peripheral edge 60a thereof to the rear panel 14 using the seam 61. In other words, the cover 60 has a fixed end at the peripheral edge 60a and a free end at the convex angle portion 60b.

The tether 70 is connected at one end thereof to the convex angle portion 60b of the cover 60. In this embodiment, the cover 60 and the tether 70 are provided separately from each other, and the tether 70 is connected at one end thereof to the convex angle portion 60b of the cover 60 using a seam 71. The cover 60 and the tether 70 may be formed in a continuous and integral manner using the same woven cloth.

In this embodiment, a tether insertion hole 24 through which the tether 70 is inserted is provided in the rear panel 14 at a portion where the convex angle portion 60b of the cover 60 is placed over or on the center side of the rear panel 14. The tether 70 is inserted through the tether insertion hole 24 into the inside of the airbag 10, and is connected at the other end to a halfway point of the strap 80 in the lengthwise direction thereof.

In this embodiment, the strap 80 consists of a first strap component 81 in the front panel 12 side and a second strap component 82 in the rear panel 14 side.

In this embodiment, the first strap component 81 includes a base portion 81a disposed in the middle of the front panel 12 and two strap-like members 81b, 81b, extending in opposite directions from the base portion 81a. The base portion 81a is sewed in the middle of the front panel 12 to the inner surface of the airbag using a seam 83.

In this embodiment, the second strap component 82 includes a base portion 82a disposed in the middle of the rear panel 14 and two strap-like members 82b, 82b, extending in opposite directions from the outer periphery of the base portion 82a. The base portion 82a is composed of a circular woven cloth having a smaller diameter than the rear panel 14, and has an inflator opening 82c formed in the middle thereof, which overlaps the inflator opening 16 of the rear panel 14. Also, the opening 82c has bolt insertion holes 82d overlapping the bolt insertion holes 18 formed therearound.

The strap-like members 81b, 82b of the strap components 81, 82 are sewed at respective one ends thereof to each other using a seam 84 to constitute a pair of straps 80.

In this embodiment, the tether 70 is sewed at the other end to a halfway point of one of the straps 80 using the seam 72. The tether 70 and the strap-like member 81b or 82b constituting the strap 80 may be formed in a continuous, integral manner using the same woven cloth.

The retainer 30 for mounting the airbag 10 has an inflator mounting opening 32 formed in the middle thereof, and the inflator mounting opening 32 has bolt insertion holes 34 formed therearound.

An inflator 36 is a substantially cylindrically-shaped component and has gas jetting ports 36a formed at a circumferential side surface of an axial end thereof. The inflator 36 is structured to eject gas in a discharge direction through the gas jetting ports 36a. The inflator 36 has a flange 38 for securing the inflator projecting from a circumferential side surface thereof at an axial, halfway position thereof on the rear end side of the gas jetting port 36a. The flange 38 has bolt insertion holes 40 formed therein. The inflator 36 is fit at its end into the inflator mounting opening 32.

To install the airbag 10 to the retainer 30, the circumferential portion of the inflator opening 82c of the base portion 82a is placed over the circumferential portion of the inflator opening 16 of the rear panel 14, and then is placed over the circumferential portion of the inflator mounting opening 32 of the retainer 30. After that, stud bolts 44 of a hold-down ring 42 are inserted through bolt insertion holes 82d, 18, 34, 40 of the base portion 82a, the rear panel 14, the retainer 30, and the flange 38, respectively, and are tightened by nuts 46, thereby securing the base portion 82a, the rear panel 14, and the inflator 36 to the retainer 30.

With this arrangement, the strap-like member 82b is connected to the rear panel 14 through the base portion 82a, and the strap-like members 82b, 81b are connected to each other using the seam 84, and the strap-like member 81b is connected to the front panel 12 through the base portion 81a.

After that, the airbag 10 is folded, and the module cover 48 is mounted to the retainer 30 so as to cover the folded airbag 10, thereby constituting an airbag apparatus. The airbag in a pre-folded state may be installed to the retainer 30.

Although not illustrated, the airbag 10 is folded with the cover 60 placed over the openable vent hole 22. By performing folding in such a manner, the airbag 10 can be inflated with the openable vent hole 22 kept closed by the cover 60 from the beginning. Various holding components such as fasteners may be used to keep the cover 60 placed over the openable vent hole 22.

Such an airbag apparatus is mounted to a vehicle steering wheel (only a circumferential rim 50 of the steering wheel is shown in FIGS. 1, 2, and 4). As shown in FIG. 4, the airbag apparatus is disposed in such a manner that the airbag 10 inflates and deploys coaxially with the rim 50 of the steering wheel.

When a vehicle having the airbag apparatus described above is subjected to a collision or the like, the inflator 36 is triggered, causing gas to be ejected to the inside of the airbag 10. The airbag 10 inflates using the gas, splits open the module cover 48, and deploys in the passenger compartment.

When the airbag 10 begins to inflate, the cover 60 is placed over the openable vent hole 22, thereby closing the openable vent hole 22. This prevents gas from being discharged from the openable vent hole 22, thereby allowing the airbag 10 to inflate in a rapid manner using gas from the inflator 36, eliminating the need for a high-power inflator as the inflator 36.

The strap 80 is extended toward the occupant in conjunction with inflation of the airbag 10. At this time, as shown in FIG. 1, the tether 70 is drawn by the strap 80 into the inside of the airbag 10, and becomes strained between the strap 80 and the cover 60. This prevents the cover 60 from moving away from the openable vent hole 22 due to gas pressure of the airbag 10 despite an increased inner pressure of the airbag 10, thereby allowing the openable vent hole 22 to be kept closed. As a result, an inner pressure of the airbag 10 is maintained at high levels.

Subsequently, when an occupant P comes into contact with the inflated airbag 10, the occupant P pushes the front panel 12 of the airbag 10 toward the rear panel 14, causing the strap 80 to become loose, which releases a force for drawing the cover 60 into the inside of the airbag 10, as shown in FIG. 2. This allows the cover 60 to move away from the openable vent hole 22 due to gas pressure of the airbag 10, releasing the openable vent hole 22. As a result, gas is discharged to the outside of the airbag 10 through both the openable vent hole 22 and the normally open vent hole 20, thereby allowing the occupant P to be softly received by the airbag 10.

The airbag 10 has the normally open vent hole 20 provided independently of the openable vent hole 22 that is opened or closed by the cover 60. For this reason, gas can be discharged to the outside of the airbag 10 through the normally open vent hole 20 even if the openable vent hole 22 is not sufficiently released since, when the occupant P comes into contact with the front panel 12, due to, for example, a small physical size of the occupant P the front panel 12 is not sufficiently moved rearward to the inside of the airbag 10 or the airbag 10 is pressed at its lower portion so that the front panel 12 is not sufficiently moved rearward to the inside of the airbag 10.

As shown in FIG. 4, in this embodiment, when the airbag 10 inflates, the openable vent hole 22 is disposed in the rear panel 14 in a region extending toward the outside of the steering wheel from the outer circumferential rim 50 of the steering wheel, thereby preventing the rim 50 from interfering with the release of the cover 60, allowing the cover 60 to be smoothly released. Also, when the airbag 10 inflates, the normally open vent hole 20 is disposed in the rear panel 14 in a region extending toward the center of the steering wheel from the rim 50, thereby preventing the rim 50 from interfering with gas discharge from the normally open vent hole 20, allowing gas to be smoothly discharged through the normally open vent hole 20.

Since the normally open vent hole 20 is disposed closer to the inflator 36 than the openable vent hole 22, namely, in the base end side from which the airbag 10 inflates, the occupant P can be softly received by gas being promptly discharged through the normally open vent hole 20 even if the occupant P, seated in, for example, an out-of-position forward from a normal seating position when the airbag begins to inflate, comes into contact with the front panel 12 of the airbag 10 before the airbag 10 fully inflates to its outer periphery.

Figure 5:
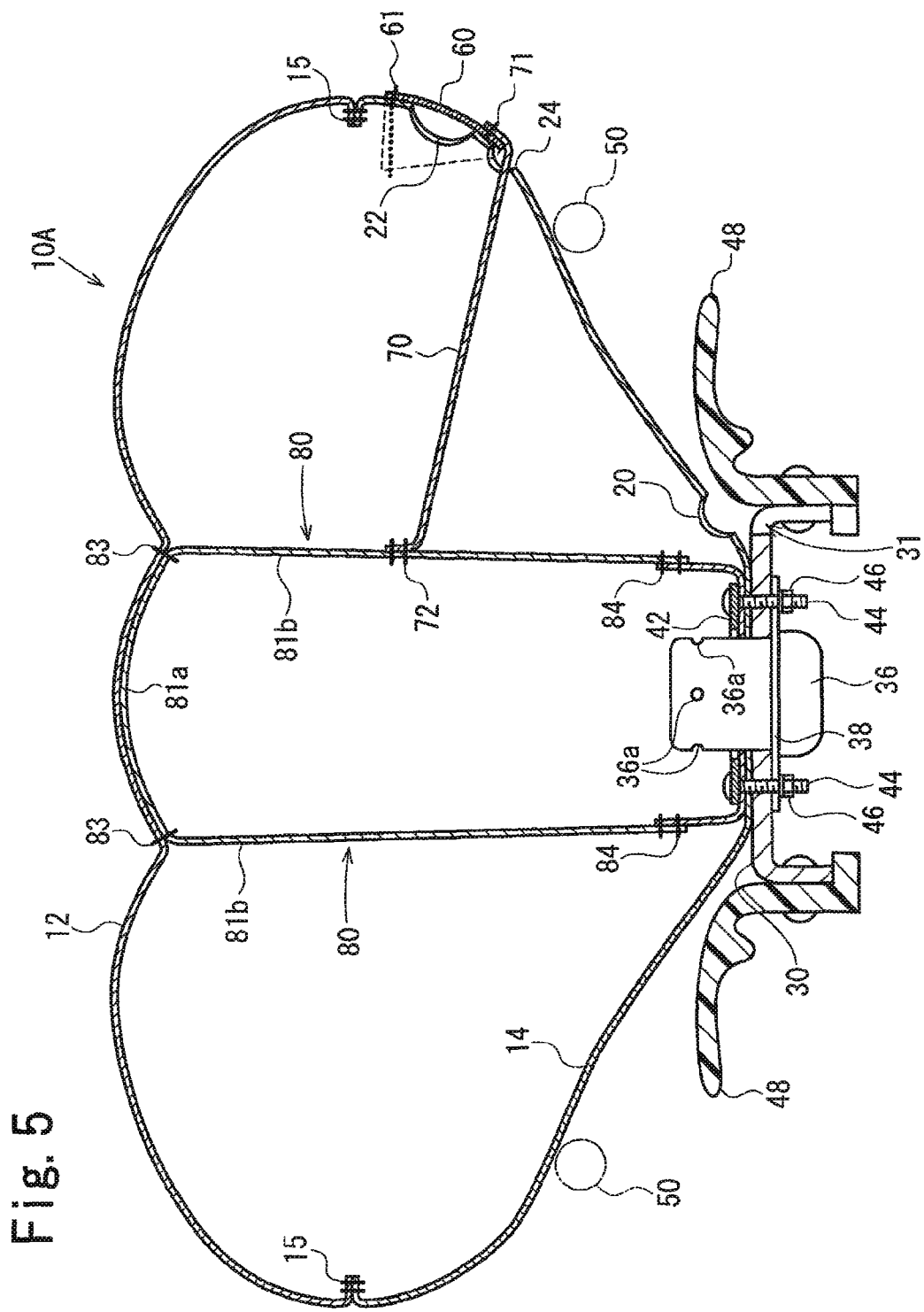
FIG. 5 is a cross-sectional view of a driver side airbag and an airbag apparatus according to an embodiment.

FIG. 5 is a cross-sectional view of a driver side airbag and an airbag apparatus according to another embodiment. FIG. 5 shows the airbag that is inflating before the occupant comes into contact with the airbag.

An airbag 10A according to this embodiment is the airbag 10 shown in FIGS. 1 to 4, wherein a normally open vent hole 20 is disposed in the rear panel 14 in a range 165 mm in diameter, which is substantially coaxial with the rear panel 14.

In the airbag 10A having this arrangement, when the airbag 10A inflates, the normally open vent hole 20 becomes face to face with the retainer 30 of the airbag apparatus or the module cover 48 that begins to split open in conjunction with inflation of the airbag.

In this embodiment, an opening 31 is provided in the retainer 30 in a portion or its vicinity with which the normally open vent hole 20 becomes face to face when the airbag 10A inflates. As shown in FIG. 5, in this embodiment the opening 31 is formed as a gap between the outer circumference of the retainer 30 and the base portion of the module cover 48.

Other configurations of the airbag 10A according to this embodiment are the same as the airbag 10 shown in FIGS. 1 to 4. Also, other configurations of an airbag apparatus according to this embodiment are the same as the foregoing embodiment shown in FIGS. 1 to 4. The reference numerals and symbols in FIG. 5 refer to the same components as those with the same reference numerals and symbols in FIGS. 1 to 4.

As shown in FIG. 5, in this embodiment, when the airbag 10A inflates, the normally open vent hole 20 becomes face to face with the retainer 30 or the module cover 48 that begins to split open in conjunction with inflation of the airbag, while gas discharged through the normally open vent hole to the outside of the airbag 10A is released into the back side of the retainer 30 or the opposite side of the airbag 10A through the opening 31 of the retainer 30. For this reason, gas discharged through the normally open vent hole 20 is not blocked by the retainer 30 or the module cover 48, resulting in smooth discharging of gas through the normally open vent hole 20.

Disposition of the opening 31 is not limited to the disposition shown in the figure. In the present invention, the opening 31 may be provided in any one of the retainer 30, the module cover 48, and a gap between the retainer 30 and the module cover 48. In addition, the opening 31 may be provided in a plurality of portions of any one of them.

In the foregoing embodiments, the normally open vent hole 20 is provided in the rear panel 14 of the airbag 10, 10A in a region which is not covered by the cover 60. In the present invention, however, if a cover for covering an openable vent hole is provided as a closing member for the openable vent hole, a normally open vent hole may be provided in such a cover.

Figure 6:
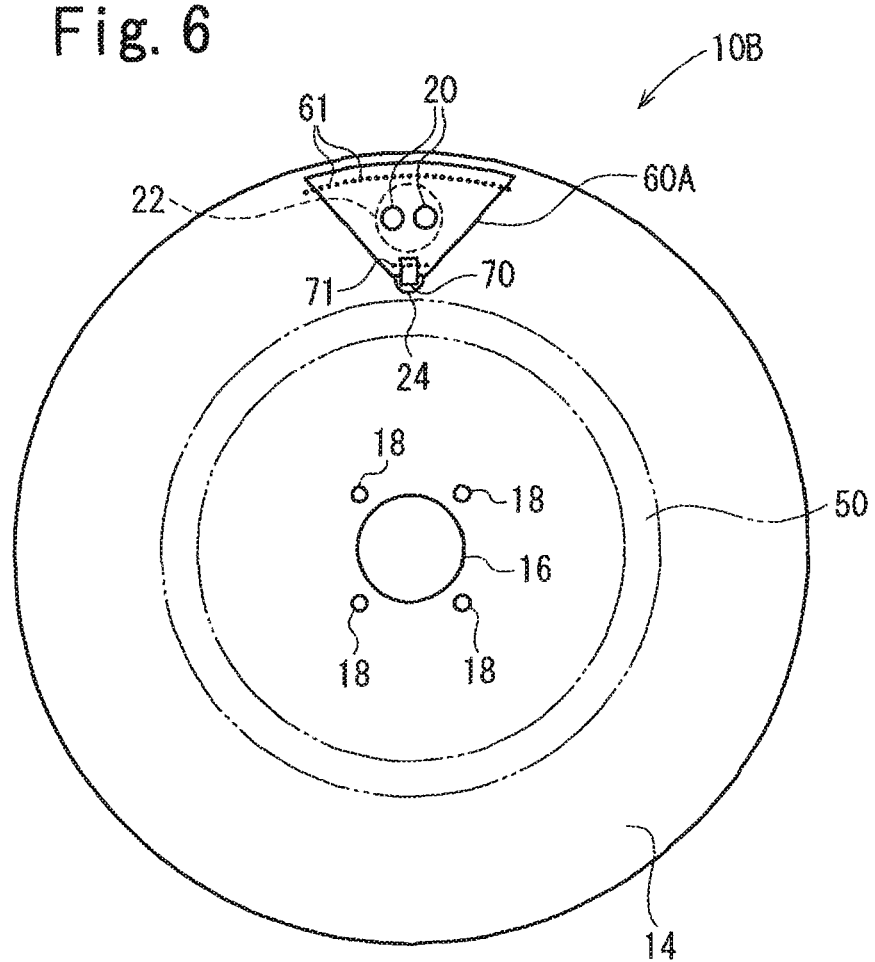
FIG. 6 is a plan view of a driver side airbag according to an embodiment, as seen from the rear panel.

FIG. 6 is a plan view showing an airbag having this arrangement, as viewed from the rear panel side.

In the airbag 10B shown in FIG. 6, no normally open vent hole is provided in the rear panel 14, and the normally open vent hole 20 is provided in the cover 60A that covers the openable vent hole 22 in a region which overlaps the openable vent hole 22. In other words, in this embodiment, even if the openable vent hole 22 is covered by the cover 60A, the inside and outside of the airbag 10B are communicated with each other via the openable vent hole 22 and the normally open vent hole 20.

In this embodiment, when the airbag 100 is inflated, two normally vent holes 20 are provided in one cover 60A so as to be spaced away from each other along a circumferential direction of the rear panel 14, but the disposition and the number of the normally open vent holes 20 to be provided in one cover 60A is not limited to this.

Other configurations of the airbag 10B according to this embodiment are the same as the airbag 10 shown in FIGS. 1 to 4. Also, the configurations of an airbag apparatus provided with the airbag 10B are the same as the foregoing embodiments shown in FIGS. 1 to 4.

In the airbag 10B, when an occupant P comes into contact with the airbag 10B with the openable vent hole 22 closed by the cover 60A at the time of inflation of the airbag 10B, gas is discharged to the outside of the airbag 10B through the openable vent hole 22 and each of the normally vent holes 20 provided in the cover 60A, thereby allowing the occupant P to be softly received.

Although no normally open vent hole 20 is provided in the rear panel 14 in this embodiment, the normally open vent hole 20 may be provided in the rear panel 14, independently of the normally opened vent hole 20 provided in the cover 60A, as is the case with the foregoing airbags 10, 10A shown in FIGS. 1 to 4 or FIG. 5.

The foregoing embodiments show an application of the present invention to automotive driver side airbags and airbag apparatuses. The present invention can also be applied to automotive passenger side airbags and airbag apparatuses.

Shown below is an application of the present invention to passenger side airbags and airbag apparatuses.

Figure 7A:
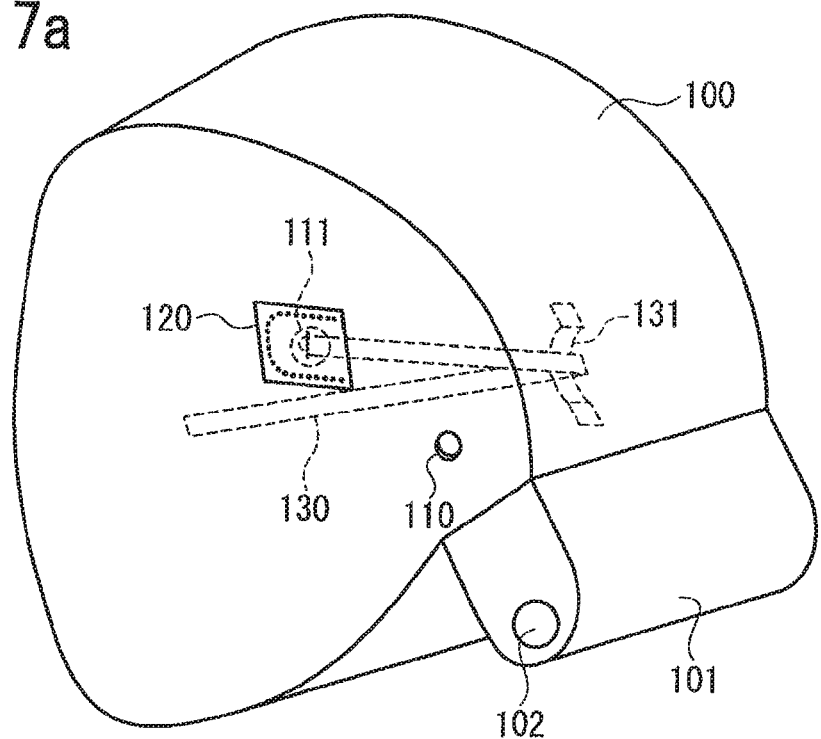
FIGS. 7a and 7b are respective configuration diagrams of a passenger side airbag and an airbag apparatus according to an embodiment.
Figure 7B:
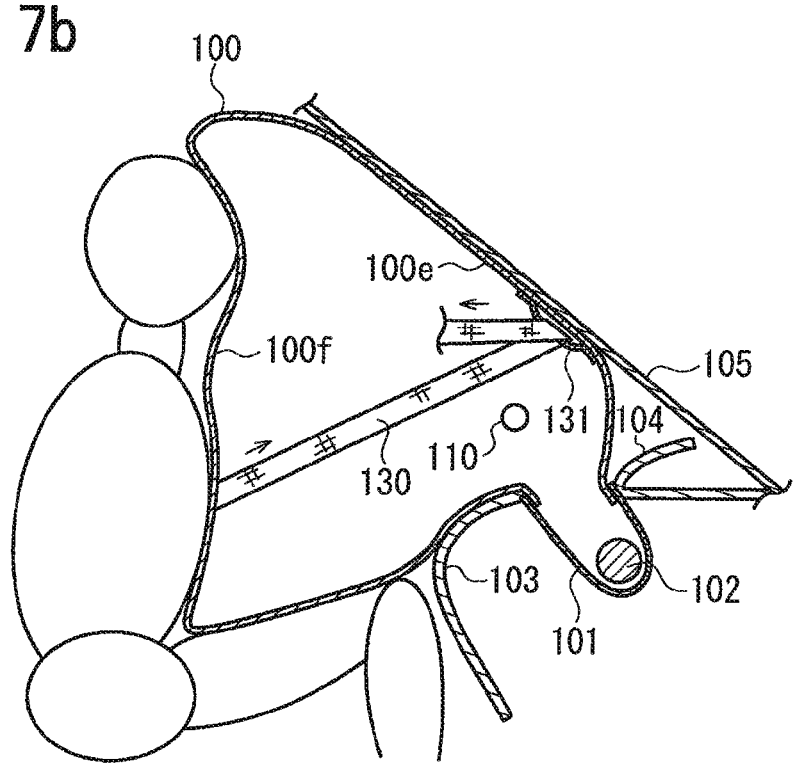
Figure 8A:
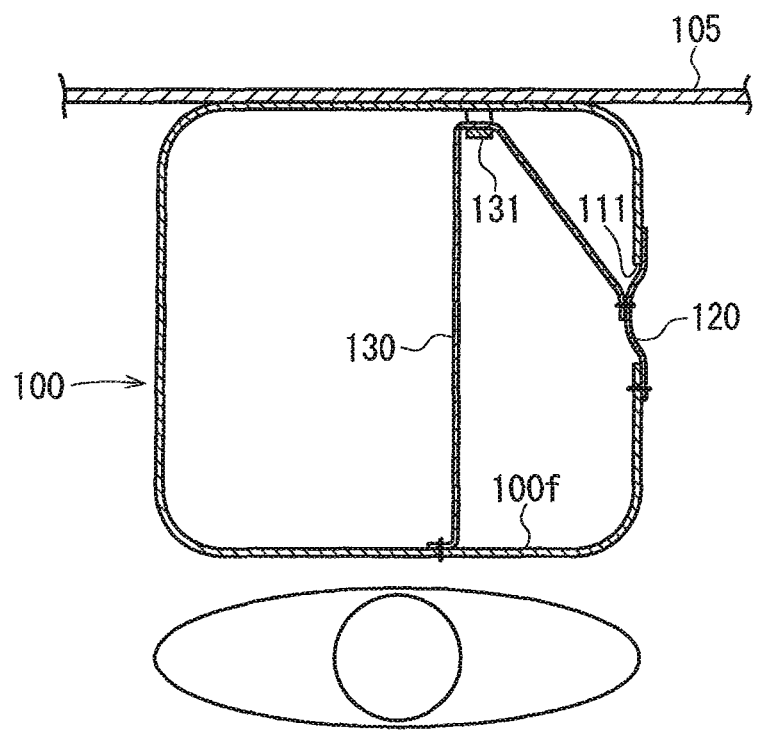
FIGS. 8a and 8b are respective horizontal cross-sectional views of an airbag of FIGS. 7a and 7b.
Figure 8B:
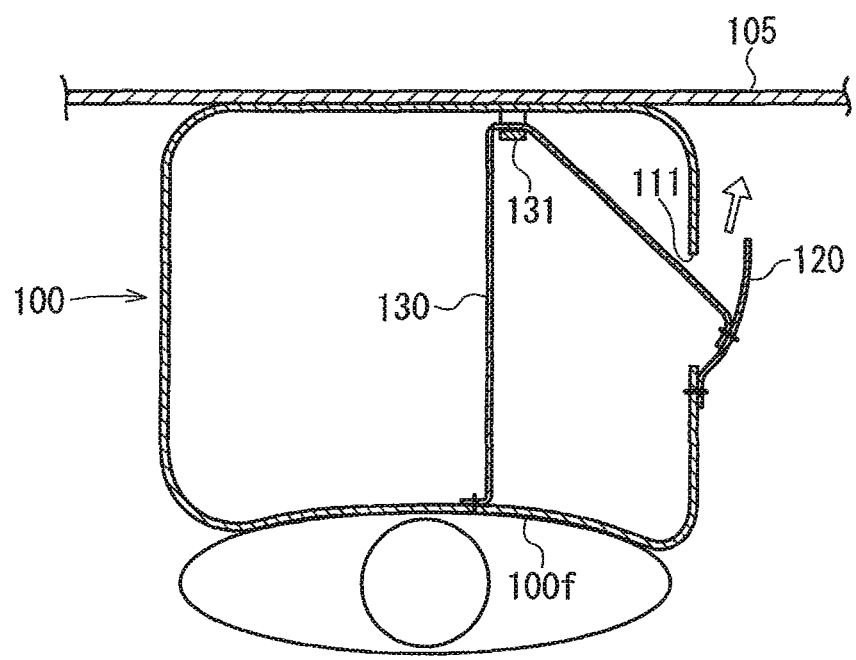

FIG. 7a is a perspective view of a passenger side airbag and an airbag apparatus according to an embodiment. FIG. 7b is a vertical cross-sectional view of such a passenger side airbag and an airbag apparatus. FIGS. 8a and 8b are a horizontal cross-sectional view of such an airbag when the airbag inflates. FIG. 8a shows the state of the airbag before the occupant comes into contact with the airbag, while FIG. 8b shows the state of the airbag after the occupant comes into contact with the airbag.

The passenger side airbag 100 is housed in a container 101 in a folded state, and is inflated by an inflator 102. The passenger side airbag 100 is mounted in an instrument panel 103. The container 101 is covered at the upper portion thereof with a lid 104. Reference numeral 105 depicts a windshield.

The passenger side airbag 100 is provided at the side thereof with an openable vent hole 111 which is covered by a cover 120 from the outside. In this embodiment, the cover 120 is composed of a substantially square-shaped woven cloth in which its three sides are sewed into the airbag 100, and remaining one side in the windshield 105 side is not connected to the airbag 100.

A tether 130 as a connecting member is sewed at one end thereof to an inner surface of the airbag 100 which corresponds to a face 100$f$ opposing an occupant, and is sewed at the other end to a cover 120 through an openable vent hole 111. In this embodiment, an insertion portion 131 is provided in the inner surface of the airbag 100 which corresponds to a face 100$e$ opposing the windshield, and the tether 130 is inserted at a lengthwise, halfway position thereof through the insertion portion 131.

In this embodiment, the normally open vent hole 110 that is normally communicated with the inside and outside of the airbag 100 is provided in the side surface of the airbag 100 at a position closer to the inflator 102 than the openable vent hole 111, namely, closer to the base end side from which the airbag 100 inflates.

Although not illustrated, the airbag 100 according to this embodiment is also folded with the cover 120 placed over the openable vent hole 111, thereby allowing the airbag 100 to begin to inflate with the openable vent hole 111 kept closed by the cover 120.

In an airbag apparatus equipped with the airbag 100, when, in the event of a vehicle collision or the like, the inflator 102 ejects gas to cause the airbag 100 to begin to inflate, the cover 120 is kept placed over the openable vent hole 111, thereby keeping the openable vent hole 111 closed. This prevents gas from being discharged through the openable vent hole 111, thereby allowing the airbag 100 to promptly inflate using gas from the inflator 102, eliminating the need for using a high-power inflator as the inflator 102.

As shown in FIGS. 7a and 8a, in conjunction with inflation of the airbag 100 the face 100$f$ opposing an occupant begins to expand toward the occupant, causing the tether 130 to be drawn into the inside of the airbag 100 and become strained between the face 100$f$ opposing the occupant and the cover 120. This prevents the cover 120 from moving away from the openable vent hole 111 due to gas pressure inside the airbag 100 even if the inner pressure of the airbag 100 increases, thereby allowing the openable vent hole 111 to be kept closed. As a result, the inner pressure of the airbag 100 is maintained at high levels.

Subsequently, as shown in FIGS. 7b and 8b, when the occupant comes into contact with the face 100f opposing the occupant of the inflated airbag 100, the face 100f opposing the occupant is pushed rearward by the occupant, releasing a force for drawing the tether 130 into the inside of the airbag 100. This causes the cover 120 to move away from the openable vent hole 111 due to gas pressure inside the airbag 100, releasing the openable vent hole 111. As a result, gas is discharged to the outside of the airbag 100 through the normally open vent hole 110 and the openable vent hole 111, thereby absorbing an impact on the occupant.

The airbag 100 also has the normally open vent hole 110 provided therein, independently of the openable vent hole 111 that is opened or closed by the cover 120. For this reason, gas can be discharged to the outside of the airbag 100 through the normally open vent hole 110 even if the openable vent hole 111 is not sufficiently released since, when the occupant comes into contact with the face 100f opposing the occupant, due to, for example, a small physical size of the occupant, the face 100f opposing the occupant is not sufficiently moved rearward to the inside of the airbag 100 or the airbag 100 is pressed at its lower portion so that the face 100f opposing the occupant is not sufficiently moved rearward to the inside of the airbag 100.

Since the airbag 100 also has the normally open vent hole 110 disposed closer to the inflator 102 side than the openable vent hole 111, namely, in the base end side from which the airbag 100 inflates, the occupant can be softly received by allowing gas to be promptly discharged through the normally open vent hole 110 even if the occupant, seated in, for example, an out-of-position forward from a normal seating position when the airbag begins to inflate, comes into contact with the face 100f opposing the occupant of the airbag 100 before the airbag 100 fully inflates toward the occupant side.

In the foregoing embodiments, the cover covers the openable vent hole from the outside of the airbag. In the present invention, the cover may cover the openable vent hole from the inside of the airbag.

Figure 9A:
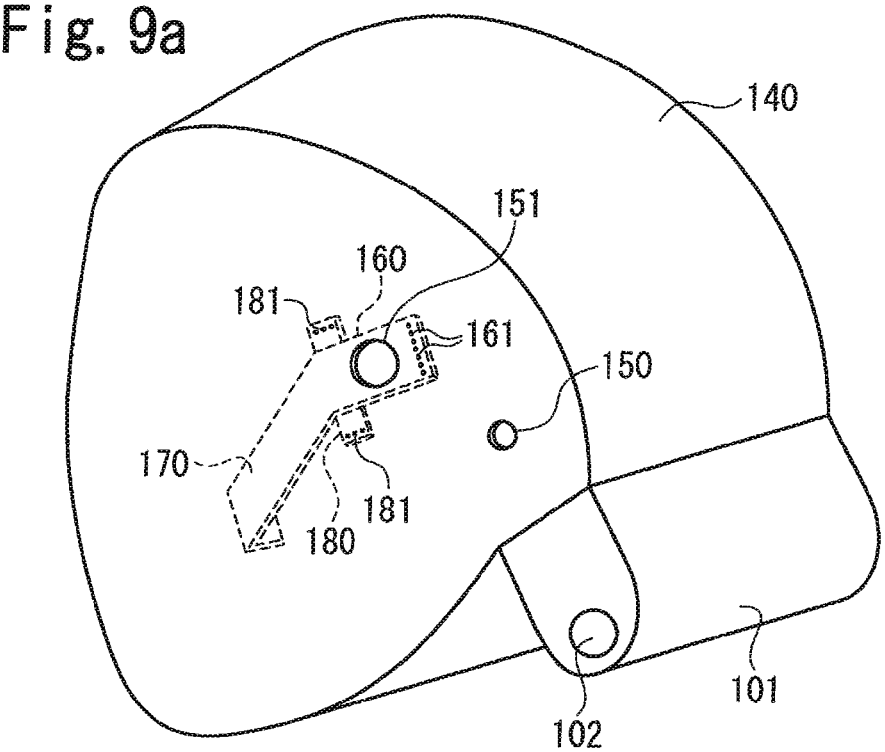
FIGS. 9a and 9b are respective configuration diagrams of a passenger side airbag and an airbag apparatus according to an embodiment.
Figure 9B:
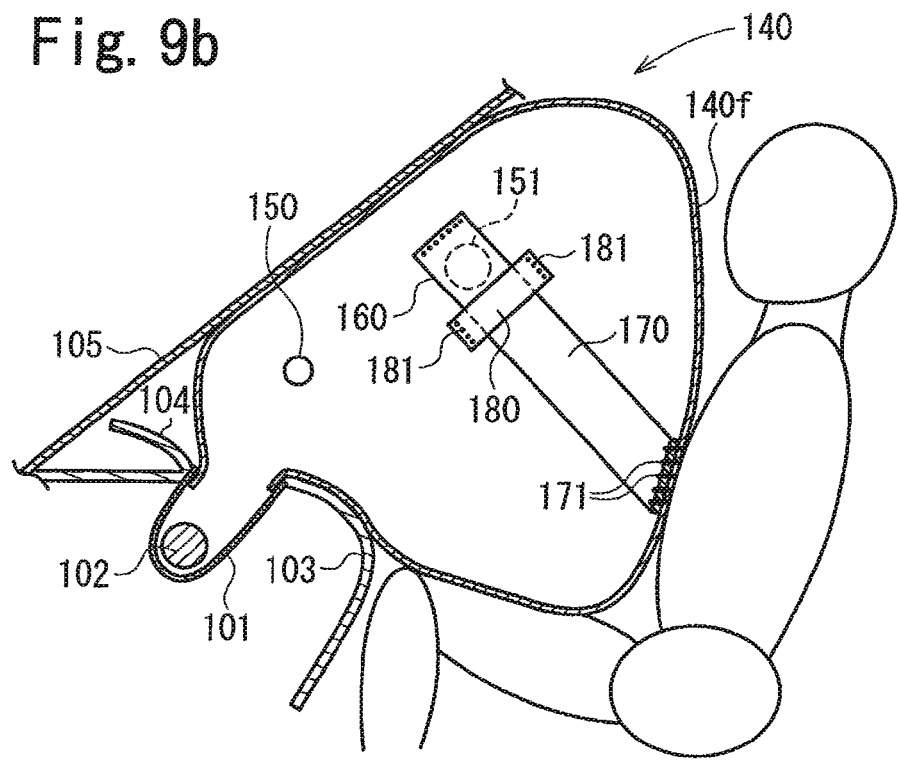
Figure 10A:
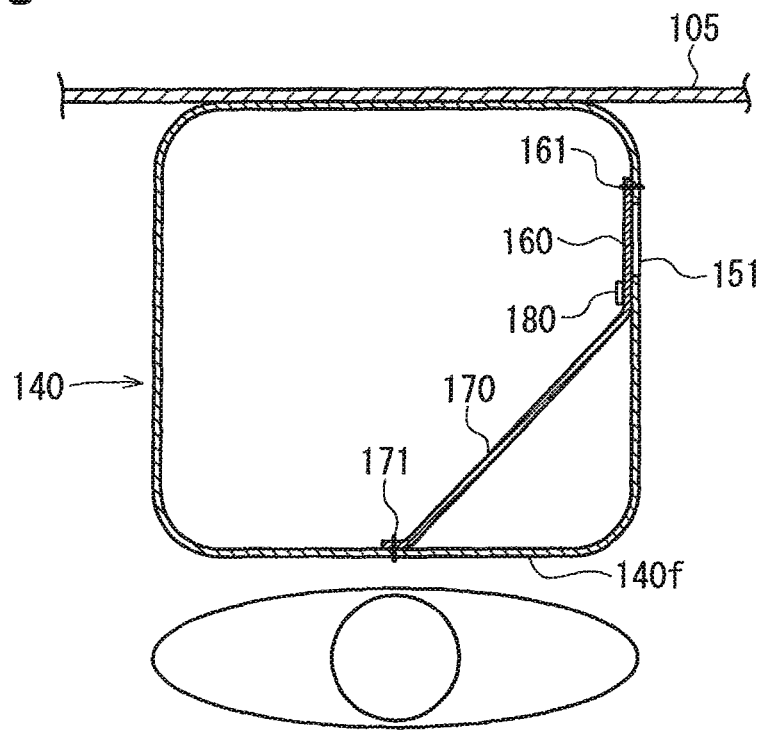
FIGS. 10a and 10b are respective horizontal cross-sectional views of FIGS. 9a and 9b.
Figure 10B:
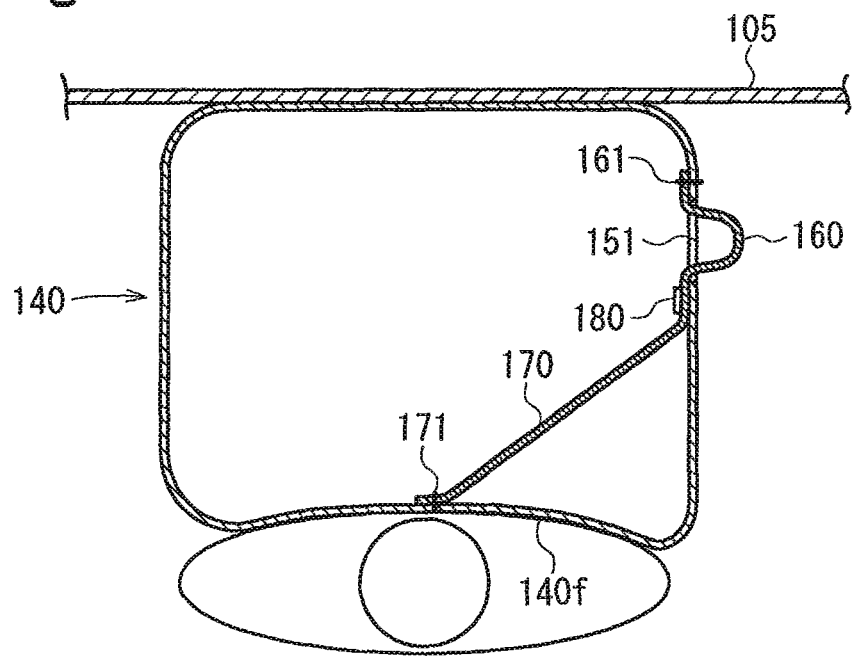

FIG. 9a is a perspective view of a passenger side airbag and an airbag apparatus configured as described above. FIG. 9b is a vertical cross-sectional view of such an airbag and an airbag apparatus. FIGS. 10a and 10b are horizontal cross-sectional views of such airbag when the airbag inflates. FIG. 10a shows the state of the airbag before the occupant comes into contact with the airbag, while FIG. 10b shows the state of the airbag after the occupant comes into contact with the airbag.

A passenger side airbag 140 according to this embodiment has an openable vent hole 151 provided at a side surface thereof, which is covered by a cover 160 from the inside of the airbag 140. The cover 160 extends in a front-back direction of the airbag 140, namely, a direction from an occupant to the opposite side of the occupant so as to cross the openable vent hole 151, and is sewed at its end of the opposite side of the occupant into an inner position of the side surface of the airbag 140 using a seam 161, which corresponds to a position in the airbag 140 to rearward of the openable vent hole 151, namely, the opposite side of the occupant. The cover 160 is connected at an occupant side end thereof to a tether 170.

Although the cover 160 and the tether 170 are formed in a continuous, integral manner in this embodiment, these may be provided separately from each other.

An insertion portion 180 for inserting the tether 170 therethrough is provided in the inner surface of the airbag 140 at a position closer to the occupant than the openable vent hole 151. In this embodiment, the insertion portion 180 is composed of a substantially rectangular-shaped, small cloth, and a pair of its short sides is sewed into the inner surface of the airbag 140 using a seam 181. The tether 170 is inserted through a space between remaining long sides of the small cloth and the inner surface of the airbag 140.

The tether 170 is inserted at its halfway position through the insertion portion 180 and is sewed at an end, namely, an end opposite to the cover 160 to a face 140f opposing the occupant of the airbag 140 using a seam 171.

The airbag 140 according to this embodiment also has a normally open vent hole 150 disposed in the side surface thereof closer to the inflator 102 than the openable vent hole 151 when the airbag 140 inflates, namely, in the base end side from which the airbag 140 inflates, the normally open vent hole 150 being normally communicated with the inside and outside of the airbag 140.

Although not illustrated, the airbag 140 according to this embodiment is also folded with the cover 160 placed over the openable vent hole 151 from the inner side of the airbag 140, thereby allowing the airbag 140 to begin to inflate with the openable vent hole 151 kept closed by the cover 160.

Other configurations of the airbag 140 according to this embodiment are the same as the airbag 100 shown in FIGS. 7a, 7b, 8a, and 8b. Also, other configurations of an airbag apparatus provided with the airbag 140 are the same as the foregoing embodiments shown in FIGS. 7a, 7b, 8a, and 8b.

In an airbag apparatus equipped with the airbag 140, when, in the event of a vehicle collision or the like, the inflator 102 ejects gas to cause the airbag 140 to begin to inflate, the cover 160 is kept placed over the openable vent hole 151, thereby keeping the openable vent hole 151 closed. This prevents gas from being discharged through the openable vent hole 151, thereby allowing the airbag 140 to promptly inflate using gas from the inflator 102, eliminating the need for using a high-power inflator as the inflator 102.

As shown in FIGS. 9a and 10a, in conjunction with inflation of the airbag 140 the face 140f opposing an occupant begins to expand toward the occupant, causing the tether 170 to become strained between the face 140f opposing the occupant and the cover 160. This prevents the cover 160 from being pushed out of the airbag 140 through the openable vent hole 151 due to gas pressure inside the airbag 140 even if the inner pressure of the airbag 140 increases, thereby allowing the openable vent hole 151 to be kept closed. As a result, the inner pressure of the airbag 140 is maintained at high levels.

Subsequently, as shown in FIGS. 9b and 10b, when the occupant comes into contact with the face 140f opposing the occupant of the inflated airbag 140, the face 140f opposing the occupant is pushed rearward by the occupant, causing the tether 170 to become loose. This causes the cover 160 to be pushed out of the airbag 140 through the openable vent hole 151 due to gas pressure inside the airbag 140, releasing the openable vent hole 151. As a result, gas is discharged to the outside of the airbag 140 through the normally open vent hole 150 and the openable vent hole 151, thereby absorbing an impact on the occupant.

The airbag 140 also has the normally open vent hole 150 provided therein, independently of the openable vent hole 151 that is opened or closed by the cover 160. For this reason, gas can be discharged to the outside of the airbag 140 through the normally open vent hole 150 even if the openable vent hole 151 is not sufficiently released since, when the occupant comes into contact with the face 140f opposing the occupant, due to, for example, a small physical size of the occupant, the face 140f opposing the occupant is not sufficiently moved rearward to the inside of the airbag 140 or the airbag 140 is pressed at its lower portion so that the face 140f opposing the occupant is not sufficiently moved rearward to the inside of the airbag 140.

Since the airbag 140 also has the normally open vent hole 150 disposed closer to the inflator 102 side than the openable vent hole 151, namely, in the base end side from which the airbag 140 inflates, the occupant can be softly received by allowing gas to be promptly discharged through the normally open vent hole 140 even if the occupant, seated in, for example, an out-of-position forward from a normal seating position when the airbag begins to inflate, comes into contact with the face 140f opposing the occupant of the airbag 140 before the airbag 140 fully inflates toward the occupant side.

Although passenger side airbags exemplified in FIGS. 9a, 9b, 10a, and 10b have an openable vent hole covered by a cover from the inside of the airbag, driver side airbags may also have such an openable vent hole covered by the cover from the inside of the airbag.

Each of the foregoing embodiments is an example of the present invention, and the present invention is not limited to the foregoing embodiments.

For example, although, when an openable vent hole is closed, the entire openable vent hole is covered by a cover in the foregoing embodiments, such an openable vent hole may be set to a small opening by partly covering with the cover when the openable vent hole is closed, while the openable vent hole may be set to a large opening when the openable vent hole is released.

In the foregoing embodiments, a cover that covers the openable vent hole from the inside or outside of the airbag is used as a closing member for the openable vent hole, but the closing member for the openable vent hole is not limited to this. For example, the closing member may be disposed at a circumferential portion of the openable vent hole, and the openable vent hole may be tied up and closed by drawing the closing member into the inside of the airbag.

The foregoing embodiments are provided as examples of the application of the present invention to automotive driver side and passenger side airbags and airbag apparatuses, but the present invention can be applied to other various types of airbags and airbag apparatuses.

The invention claimed is:

1. An airbag that inflates using gas from an inflator, the airbag comprising:
   a normally open vent hole that is normally open; and
   an openable vent hole that can be opened or closed by a closing member,
   wherein the closing member closes the openable vent hole when the airbag begins to inflate, the airbag is a driver side airbag that inflates toward an occupant side of a vehicle steering wheel and, when the airbag inflates, the openable vent hole is disposed in a region extending toward the outside of the steering wheel from a rim of the steering wheel, and the normally open vent hole is disposed in a region extending toward the center of the steering wheel from the rim, and
   wherein, when the airbag inflates, the normally open vent hole is disposed in the airbag in a range 330 mm in diameter, which is substantially coaxial with the steering wheel.

2. The airbag according to claim 1, wherein a total opening area of the normally open vent hole is smaller than a total opening area of the openable vent hole in an open state.

3. The airbag according to claim 2, wherein a total opening area of the normally open vent hole is 5 to 50% of a total opening area of the openable vent hole in an open state.

4. The airbag according to claim 1, wherein the normally open vent hole is disposed in the airbag in a position closer to the inflator than the openable vent hole in the airbag.

5. The airbag according to claim 1, wherein, when the airbag inflates, the normally open vent hole is disposed in the airbag in a range 165 mm in diameter, which is substantially coaxial with the steering wheel.

6. The airbag according to claim 5, the normally open vent hole has a total opening area of 175 to 650 mm$^2$.

7. An airbag apparatus comprising:
   an airbag according to claim 5;
   an inflator for inflating the airbag;
   a mounting member to which the airbag is mounted; and
   a module cover that is mounted to the mounting member so as to cover the airbag in a non-inflated state and splits open at the time of inflation of the airbag inflates,
   wherein at least one portion of the mounting member, the module cover, and a section between the mounting member and the module cover has an opening provided for releasing gas discharged from the normally open vent hole of the airbag into a side, opposite to the airbag, of at least one of the mounting member and the module cover.

8. An airbag that inflates using gas from an inflator, the airbag comprising:
   a normally open vent hole that is normally open; and
   an openable vent hole that can be opened or closed by a closing member,
   wherein the closing member closes the openable vent hole when the airbag begins to inflate, and
   wherein the closing member is a cover covering the openable vent hole, which is provided with a connecting member that connects a side opposing an occupant of the airbag and the closing member through the inside of the airbag, wherein, when the airbag begins to inflate, the cover is placed over the openable vent hole, thereby closing the openable vent hole, wherein, until the occupant comes into contact with the side opposing the occupant of the inflated airbag, the connecting member is under strain between the side opposing the occupant of the airbag and the cover, thereby preventing the cover from moving away from the openable vent hole and thereby keeping the openable vent hole closed with the cover, and wherein, when the occupant comes into contact with the side opposing the occupant of the inflated airbag, pushing the side opposing the occupant into the inside of the airbag, the connecting member becomes loose, causing the cover to move away from the openable vent hole due to gas pressure inside the airbag, thereby causing the openable vent hole to be opened.

9. The airbag according to claim 8, wherein the airbag is a driver side airbag that inflates toward an occupant side of a vehicle steering wheel and, wherein, when the airbag inflates, the openable vent hole is disposed in a region extending toward the outside of the steering wheel from a rim of the steering wheel, and the normally open vent hole is disposed in a region extending toward the center of the steering wheel from the rim.

10. The airbag according to claim 8, wherein the normally open vent hole is provided in a region of the cover which overlaps the openable vent hole.

11. The airbag according to claim 8, wherein the airbag is folded with the cover placed over the openable vent hole.

12. The airbag according to claim 8, wherein, when the airbag begins to inflate, the cover is placed and held over the openable vent hole by a holding member.

* * * * *

UNITED STATES PATENT AND TRADEMARK OFFICE
CERTIFICATE OF CORRECTION

PATENT NO.       : 8,419,054 B2
APPLICATION NO.  : 12/672755
DATED            : April 16, 2013
INVENTOR(S)      : Kazuhiro Abe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this
First Day of September, 2015

Michelle K. Lee
*Director of the United States Patent and Trademark Office*